United States Patent
Rojas

(10) Patent No.: US 9,621,490 B2
(45) Date of Patent: *Apr. 11, 2017

(54) SYSTEM AND METHOD FOR INSTANT VOIP MESSAGING

(71) Applicant: Uniloc Luxembourg S.A., Luxembourg (LU)

(72) Inventor: Michael J. Rojas, North Canton, OH (US)

(73) Assignee: Uniloc Luxembourg S.A., Luxembourg (LU)

( * ) Notice: Subject to any disclaimer, the term of this patent is extended or adjusted under 35 U.S.C. 154(b) by 59 days.

This patent is subject to a terminal disclaimer.

(21) Appl. No.: 14/633,057

(22) Filed: Feb. 26, 2015

(65) Prior Publication Data
US 2015/0172231 A1    Jun. 18, 2015

Related U.S. Application Data

(63) Continuation of application No. 14/224,125, filed on Mar. 25, 2014, now Pat. No. 8,995,433, which is a continuation of application No. 13/546,673, filed on Jul. 11, 2012, now Pat. No. 8,724,622, which is a continuation of application No. 12/398,063, filed on Mar. 4, 2009, now Pat. No. 8,243,723, which is a continuation of application No. 10/740,030, filed on Dec. 18, 2003, now Pat. No. 7,535,890.

(51) Int. Cl.
| | |
|---|---|
| *H04L 12/66* | (2006.01) |
| *H04L 12/58* | (2006.01) |
| *H04M 3/533* | (2006.01) |
| *H04M 7/00* | (2006.01) |
| *H04L 29/06* | (2006.01) |

(52) U.S. Cl.
CPC ............ *H04L 51/04* (2013.01); *H04L 12/581* (2013.01); *H04L 65/40* (2013.01); *H04M 3/533* (2013.01); *H04M 3/53366* (2013.01); *H04M 7/006* (2013.01); *H04M 2203/4536* (2013.01)

(58) Field of Classification Search
USPC ......................................................... 370/352
See application file for complete search history.

(56) References Cited

U.S. PATENT DOCUMENTS

| | | |
|---|---|---|
| 6,763,226 B1 | 7/2004 | McZeal, Jr. |
| 7,013,155 B1 | 3/2006 | Ruf et al. |
| 7,133,687 B1 | 11/2006 | El-Fishawy et al. |
| 7,317,929 B1 | 1/2008 | El-Fishawy et al. |

(Continued)

OTHER PUBLICATIONS http://www.cisco.com/warp/public/cc/pd/nemnsw/callmn/prodlit/cm33_ds.htm; "Data Sheet Cisco CallManager Version 3.3".

(Continued)

*Primary Examiner* — Creighton Smith
(74) *Attorney, Agent, or Firm* — Sean D. Burdick

(57) ABSTRACT

Methods, systems and programs for instant voice messaging over a packet-switched network are provided. A method for instant voice messaging may comprise receiving an instant voice message having one or more recipients, delivering the instant voice message to the one or more recipients over a packet-switched network, temporarily storing the instant voice message if a recipient is unavailable; and delivering the stored instant voice message to the recipient once the recipient becomes available.

20 Claims, 9 Drawing Sheets

(56) References Cited

U.S. PATENT DOCUMENTS

| | | |
|---|---|---|
| 7,535,890 B2 | 5/2009 | Rojas |
| 8,199,747 B2 | 6/2012 | Rojas |
| 8,243,723 B2 | 8/2012 | Rojas |
| 2003/0087632 A1 | 5/2003 | Sagi et al. |
| 2003/0126207 A1 | 7/2003 | Creamer et al. |
| 2004/0003046 A1* | 1/2004 | Grabelsky ............... H04L 29/06 709/206 |
| 2004/0014456 A1 | 1/2004 | Vaananen |
| 2004/0030046 A1 | 2/2004 | Schultes et al. |
| 2004/0064317 A1 | 4/2004 | Othmer et al. |
| 2004/0085456 A1 | 5/2004 | Kwag et al. |
| 2004/0122906 A1 | 6/2004 | Goodman et al. |
| 2004/0128356 A1 | 7/2004 | Bernstein et al. |
| 2004/0179092 A1 | 9/2004 | LaPoint |
| 2004/0223599 A1 | 11/2004 | Bear et al. |
| 2004/0224678 A1* | 11/2004 | Dahod ................... H04W 4/06 455/426.1 |
| 2004/0225524 A1 | 11/2004 | Narasimhan et al. |
| 2004/0252679 A1 | 12/2004 | Williams et al. |
| 2005/0053230 A1 | 3/2005 | Gierachf |
| 2005/0105697 A1 | 5/2005 | Hollowell et al. |
| 2005/0117591 A1 | 6/2005 | Hurtta et al. |
| 2006/0094472 A1 | 5/2006 | Othmer et al. |
| 2006/0167883 A1 | 7/2006 | Boukobza |
| 2006/0268750 A1 | 11/2006 | Weiner |
| 2007/0112925 A1 | 5/2007 | Malik |
| 2007/0174403 A1 | 7/2007 | Barry |
| 2008/0298309 A1 | 12/2008 | DePietro et al. |
| 2010/0070275 A1 | 3/2010 | Cast |
| 2012/0275452 A1 | 11/2012 | Rojas |
| 2013/0066989 A1 | 3/2013 | Enete et al. |
| 2013/0279681 A1 | 10/2013 | Weiner |

OTHER PUBLICATIONS http://www.cisco.com/en/US/products/hw/switches/ps1925/products_data_sheet_09186_a00800a3c3d.html; "Data Sheet Cisco MGX 8000 Series".

http://www.hsteliann.com/english/?zone=3100-V21P; "Teliphone 3100-V21P".

http://www.linuxdevices.com/articles/AT5199947519.html; "Device Profile: snom 100 VoIP phone".

http://www.pingtel.com/pr_xpressa.jsp; "No limits with the advanced industry standard SIP phone".

AudioCoded Enabling Technology Products, TPM-1100 VoP Media Gateway Modules.

* cited by examiner

SYSTEM AND METHOD FOR INSTANT VoIP MESSAGING

CROSS-REFERENCE TO RELATED APPLICATION

This application is a continuation of U.S. application Ser. No. 14/224,125, filed Mar. 25, 2014, which is a continuation of U.S. application Ser. No. 13/546,673, filed Jul. 11, 2012, now U.S. Pat. No. 8,724,622, issued May 13, 2014, which is a continuation of U.S. application Ser. No. 12/398,063 filed Mar. 4, 2009, now U.S. Pat. No. 8,243,723, issued Aug. 14, 2012, which is a continuation of U.S. application Ser. No. 10/740,030 filed on Dec. 18, 2003, now U.S. Pat. No. 7,535,890, issued May 19, 2009, the entire content and disclosure of which is incorporated by reference.

BACKGROUND OF THE INVENTION

Technical Field of the Invention

The present invention generally relates to Internet telephony (IP telephony). More particularly, the present invention is directed to a system and method for enabling local and global instant VoIP messaging over an IP network, such as the Internet, with PSTN support.

Description of the Prior Art

Traditional telephony is based on a public switched telephone network (i.e., "PSTN"). In the PSTN, a telephone terminal is electrically connected to a conventional or legacy switch. The telephone terminal and the legacy switch communicate via a proprietary protocol, which may be different depending on the vendor of the legacy switch. Circuit switching provides a communication path (i.e., dedicated circuit) for a telephone call from the telephone terminal to another device over the PSTN, including another telephone terminal. During the telephone call, voice communication takes place over that communication path.

An alternative to the PSTN is Voice over Internet Protocol (i.e., "VoIP"), also known as IP telephony or Internet telephony. In the IP telephony, a VoIP terminal device is connected to a packet-switched network (e.g., Internet) and voice communication from the VoIP terminal device is digitized, packetized and transmitted over the packet-switched network to a destination VoIP terminal device, which reconstructs the packets and audibly plays, stores or otherwise processes the transmission. The VoIP terminal device may be a VoIP telephone or a general-purpose personal computer (PC) enabled for IP telephony. More specifically, the PC is programmed with the software and equipped with audio input/output devices (e.g., a combination of microphone and speaker or a headset) to serve as a VoIP terminal device. The PC so enabled and equipped will herein be referred to as a VoIP terminal device or a VoIP softphone.

FIG. 1 is an illustrative example of a prior art IP telephony system 100. The IP telephony system 100 comprises a packet-switched IP network 102, such as the Internet, which transmits VoIP traffic from and to a plurality of terminal devices 104, 106 and 110. Terminal device 104 is a VoIP softphone that is enabled for IP telephony over the network 102. Terminal device 106 is a VoIP telephone, which is connected to the network 102 via a softswitch 108. The VoIP softswitch 108 is disposed on the packet-switched network (e.g., Internet) 102 between an origination terminal device (such as VoIP softphone 104) and a destination terminal device (such as VoIP telephone 106), and routes packets over the packet-switched IP network 102. The softswitch 108 may also manage and perform administrative functions for the terminal device or devices (e.g., VoIP telephone 106) to which it is connected. Whether the terminal device is a VoIP softphone 104 or a VoIP telephone 106, the terminal device is connected to the IP network 102 via a networking standard such as Ethernet, Bluetooth, IEEE 1394 (also known as "Firewire"), IEEE 802.11 (also known as "WiFi"), or networking over serial communication channels such as the Universal Serial Bus (i.e., "USB"). Data communication over the network then takes place using a connection protocol, e.g., transfer control protocol/Internet protocol (i.e., "TCP/IP").

Further regarding FIG. 1, terminal device 110 is a legacy telephone that is connected to a legacy switch 112 for (circuit-switched) voice communications over the PSTN 116 with other terminal devices. A media gateway 114 may be provided between the legacy switch 112 and the packet-switched network 102 to enable IP telephony between the legacy telephone 110 and a VoIP terminal device, such as a VoIP softphone 104 or VoIP telephone 106. More specifically, the media gateway 114 converts the audio signal carried over PSTN to packets carried over the packet-switched IP network 102. In addition, a media gateway 118 may be disposed over the PSTN 116 and connected to a softswitch 120 to convert the audio signal from the legacy telephone 110 to packets routed over the IP network 102 via the softswitch 120.

Voice messaging in both the VoIP and PSTN is known. More specifically, the foregoing systems may be provided with a facility to allow users to leave voice messages for recipients, which is a feature that is familiar to anyone who uses a telephone. Conventionally, leaving a voice message involves dialing the recipient's telephone number (often without knowing whether the recipient will answer), waiting for the connection to be established, speaking to an operator or navigating through a menu of options, listening to a greeting message, and recording the message for later pickup by the recipient. In that message, the user must typically identify himself or herself in order for the recipient to return the call.

Instant text messaging is likewise known. More specifically, a user is provided with a client terminal, which is typically a general-purpose PC programmed with instant text messaging software and in data communication over an IP network with an instant text-messaging server. The instant text-messaging server presents the user, via the client terminal, with a list of persons who are currently "online" and ready to receive text messages on their own client terminals. The user then uses the client terminal to select one or more persons to whom the message will be sent and types in a text message. The text message is sent immediately via the text-messaging server to the selected one or more persons and is displayed on their respective client terminals.

However, notwithstanding the foregoing advances in the VoIP/PSTN voice communication and voice/text messaging, there is still a need in the art for providing a system and method for providing instant VoIP messaging over an IP network. More particularly, there is a need in the art for providing local and global instant voice messaging over VoIP with PSTN support.

SUMMARY OF THE INVENTION

The present invention is directed to a system and method for enabling local and global instant VoIP messaging over an IP network, such as the Internet.

According to an embodiment of the present invention, there is provided an instant voice messaging system for delivering instant messages over a packet-switched network, the system comprising: a client connected to the network, the client selecting one or more recipients, generating an instant voice message therefor, and transmitting the selected recipients and the instant voice message therefor over the network; and a server connected to the network, the server receiving the selected recipients and the instant voice message therefor, and delivering the instant voice message to the selected recipients over the network, the selected recipients being enabled to audibly play the instant voice message.

According to another embodiment of the present invention, there is provided an instant voice messaging system for delivering instant messages over a packet-switched network enabling public switched telephone network (PSTN) support, the system comprising: a PSTN telephone connected to the network for providing input audio; a client connected to the network, the client selecting one or more recipients, generating an instant voice message therefor using the input audio provided by the PSTN telephone, and transmitting the selected recipients and the instant voice message therefor over the network; a server connected to the network, the server receiving the selected recipients and the instant voice message therefor, and delivering the instant voice message to the selected recipients over the network, the selected recipients being enabled to audibly play the instant voice message.

According to a further embodiment of the present invention, there is provided an instant voice messaging system for delivering instant messages over a packet-switched network, the system comprising: a voice-over-internet-protocol (VoIP) telephone connected to the network for providing input audio; a client connected to the network, the client selecting one or more recipients, generating an instant voice message therefor using the input audio provided by the VoIP telephone, and transmitting the selected recipients and the instant voice message therefor over the network; a server connected to the network, the server receiving the selected recipients and the instant voice message therefor, and delivering the instant voice message to the selected recipients over the network, the selected recipients being enabled to audibly play the instant voice message.

According to still another embodiment of the present invention, there is provided an instant voice messaging system for delivering instant messages over a plurality of packet-switched networks, the system comprising: a client connected to a local network, the client selecting one or more external recipients connected to an external network outside the local network, generating an instant voice message therefor, and transmitting the selected recipients and the instant voice message therefor over the local network and the external network; and a server connected to the external network, the server receiving the selected recipients and the instant voice message therefor, and delivering the instant voice message to the selected recipients over the external network, the selected recipients being enabled to audibly play the instant voice message.

According to yet another embodiment of the present invention, there is provided an instant voice messaging system for delivering instant messages over a plurality of packet-switched networks enabling public switched telephone network (PSTN) support, the system comprising: a PSTN telephone connected to a local network for providing input audio; a client connected to the local network, the client selecting one or more external recipients connected to an external network outside the local network, generating an instant voice message therefor using the input audio provided by the PSTN telephone, and transmitting the selected recipients and the instant voice message therefor over the local network and the external network; a server connected to the external network, the server receiving the selected recipients and the instant voice message therefor, and delivering the instant voice message to the selected recipients over the external network, the selected recipients being enabled to audibly play the instant voice message.

According to yet a further embodiment of the present invention, there is provided an instant voice messaging system for delivering instant messages over a plurality of packet-switched networks, the system comprising: a voice-over-internet-protocol (VoIP) telephone connected to a local network for providing input audio; a client connected to the local network, the client selecting one or more external recipients connected to an external network outside the local network, generating an instant voice message therefor using the input audio provided by the VoIP telephone, and transmitting the selected recipients and the instant voice message therefor over the local network and the external network; an server connected to the external network, the external server receiving the selected recipients and the instant voice message therefor, and delivering the instant voice message to the selected recipients over the external network, the selected recipients being enabled to audibly play the instant voice message.

According to still a further embodiment of the present invention, there is provided an instant voice messaging system for delivering instant messages over a plurality of packet-switched networks, the system comprising: a client connected to an external network, the client selecting one or more recipients connected to a local network, generating an instant voice message therefor, and transmitting the selected recipients and the instant voice message therefor over the external network; an external server system connected to the external network, the external server system receiving the selected recipients and the instant voice message, and routing the selected recipients and the instant voice message over the external network and the local network; a local server connected to the local network, the local server receiving the selected recipients and the instant voice message therefor, and delivering the instant voice message to the selected recipients over the local network, the selected recipients being enabled to audibly play the instant voice message.

According to an embodiment of the present invention, there is provided a method for instant voice messaging over a packet-switched network, the method comprising: selecting one or more recipients for instant voice messaging at a client; generating an instant voice message for the selected recipients at the client; transmitting the selected recipients and the instant voice message therefor over the network from the client to a server; receiving the selected recipients and the instant voice message therefor at the server; delivering the instant voice message from the server to the selected recipients over the network; and audibly playing the instant voice message at the selected recipients.

According to another embodiment of the present invention, there is provided a method for instant voice messaging over a packet-switched network enabling public switched telephone network (PSTN) support, the method comprising: providing input audio via a PSTN telephone connected over the network; selecting one or more recipients for instant voice messaging at a client; generating an instant voice message using the input audio from the PSTN telephone for the selected recipients at the client; transmitting the selected recipients and the instant voice message therefor over the network from the client to a server; receiving the selected recipients and the instant voice message therefor at the server; delivering the instant voice message from the server to the selected recipients over the network; and audibly playing the instant voice message at the selected recipients.

According to a further embodiment of the present invention, there is provided a method for instant voice messaging over a packet-switched network, the method comprising: providing input audio via a voice-over-internet-protocol (VoIP) telephone connected over the network; selecting one or more recipients for instant voice messaging at a client; generating an instant voice message using the input audio from the VoIP telephone for the selected recipients at the client; transmitting the selected recipients and the instant voice message therefor over the network from the client to a server; receiving the selected recipients and the instant voice message therefor at the server; delivering the instant voice message from the server to the selected recipients over the network; and audibly playing the instant voice message at the selected recipients.

According to still another embodiment of the present invention, there is provided a method for instant voice messaging over a plurality of packet-switched networks, the method comprising: selecting one or more external recipients for instant voice messaging at a client connected to a local network, the one or more external recipients connected to an external network outside the local network; generating an instant voice message for the selected external recipients at the client; transmitting the selected external recipients and the instant voice message therefor over the local network and the external network; receiving the selected external recipients and the instant voice message therefor at an external server connected to the external network; delivering the instant voice message to the selected external recipients over the external network; and audibly playing the instant voice message at the selected external recipients.

According to yet another embodiment of the present invention, there is provided a method for instant voice messaging system over a plurality of packet-switched networks enabling public switched telephone network (PSTN) support, the method comprising: providing input audio via a PSTN telephone connected to a local network; selecting one or more external recipients for instant voice messaging at a client, the one or more external recipients connected to an external network outside the local network; generating an instant voice message for the one or more external recipients using the input audio provided by the PSTN telephone; transmitting the selected recipients and the instant voice message therefor over the local network and the external network; receiving the selected recipients and the instant voice message therefor at a server connected to the external network; delivering the instant voice message to the selected recipients from the server over the external network; and audibly playing the instant voice message at the selected recipients.

According to still a further embodiment of the present invention, there is provided a method for instant voice messaging system over a plurality of packet-switched networks, the method comprising: providing input audio via a voice-over-internet-protocol (VoIP) telephone connected to a local network; selecting one or more external recipients for instant voice messaging at a client, the one or more external recipients connected to an external network outside the local network; generating an instant voice message for the one or more external recipients using the input audio provided by the VoIP telephone; transmitting the selected recipients and the instant voice message therefor over the local network and the external network; receiving the selected recipients and the instant voice message therefor at a server connected to the external network; delivering the instant voice message to the selected recipients from the server over the external network; and audibly playing the instant voice message at the selected recipients.

According to yet a further embodiment of the present invention, there is provided a method for instant voice messaging over a plurality of a plurality of packet-switched networks, the method comprising: selecting one or more recipients connected to a local network at a client connected to an external network; generating an instant voice message for the selected recipients at the client; transmitting the selected recipients and the instant voice message therefor over the external network from the client to an external server system; receiving the selected recipients and the instant voice message at the external server system; routing the selected recipients and the instant voice message over the external network and the local network; receiving the selected recipients and the instant voice message therefor at a local server connected to the local network; delivering the instant voice message to the selected recipients over the local network; audibly playing the instant voice message at the selected recipients.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

The present invention is directed to a system and method for enabling local and global instant VoIP messaging over an IP network with PSTN support.

Figure 1:
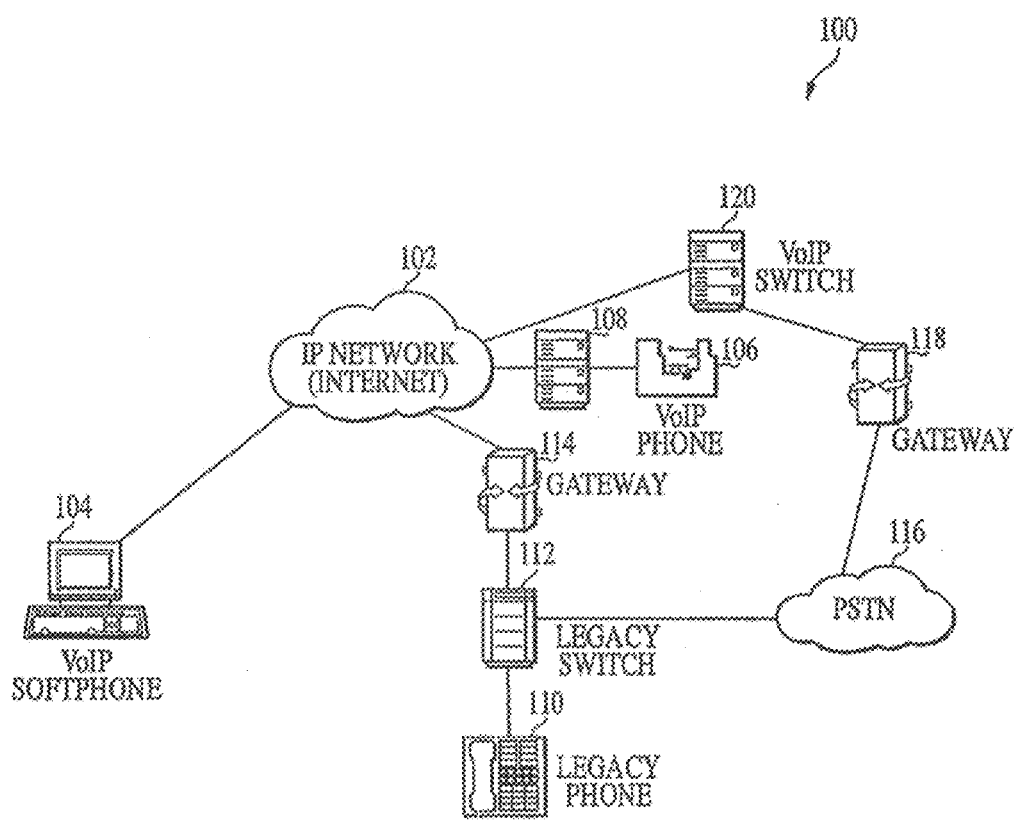
FIG. 1 illustrates an example of a prior art IP telephony system.
Figure 2:
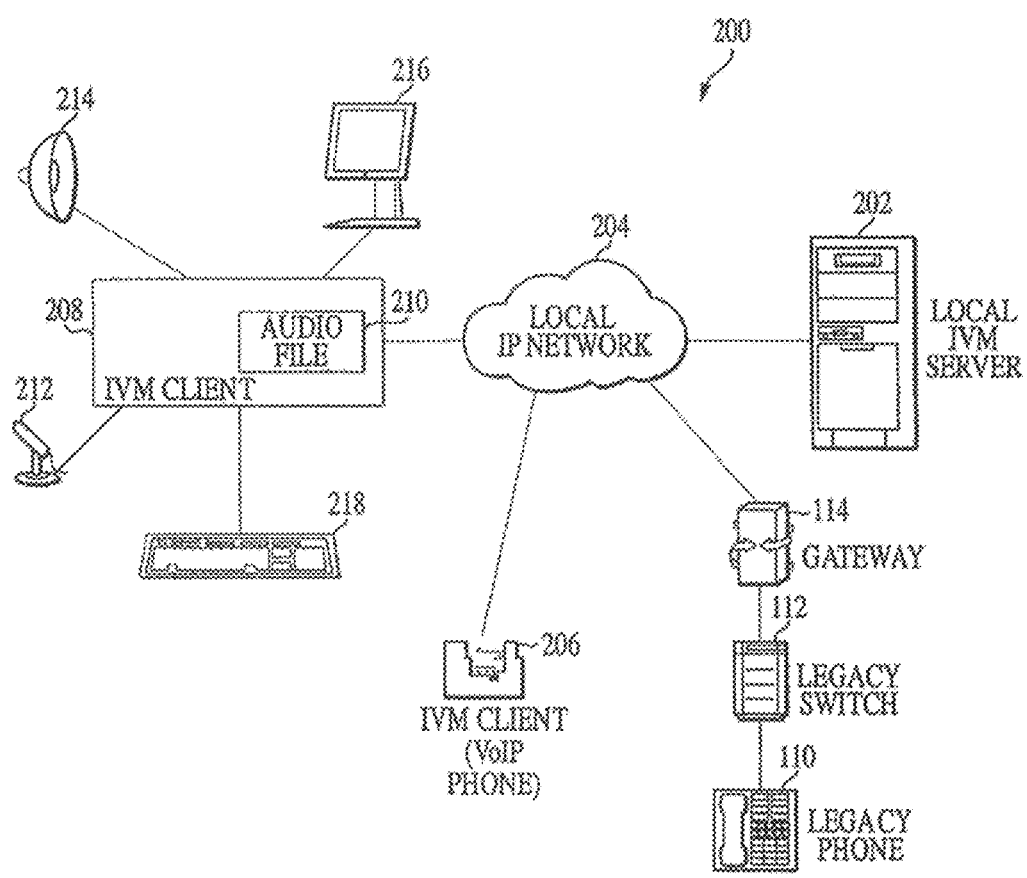
FIG. 2 illustrates an exemplary local IVM system for enabling instant voice messaging according to the present invention.

FIG. 2 is an exemplary illustration of a local instant voice messaging (IVM) system 200 according to the present invention. The instant voice messaging system 200 comprises a local IVM server 202 that provides the core functionality for enabling instant voice messaging with PSTN support according to the present invention. The architecture of the local IVM server 202 will be described in detail hereinbelow with reference to FIG. 4. According to the exemplary IVM system 200, the local IVM server 202 is enabled to provide instant voice messaging to one or more IVM clients 206 and 208, as well support instant voice messaging for PSTN legacy telephones 110. It is noted that although FIG. 2 depicts one of each IVM client 206, 208 and legacy telephone 110 for clarity and brevity, the local IVM server 202 is enabled to support a plurality of each of the foregoing IVM clients 206, 208 and legacy telephone 110. The local packet-switched IP network 204 interconnects the IVM clients 206, 208 and the legacy telephone 110 to the local IVM server 202 as well as interconnecting the local IVM server 202 to the local IP network 204. The network 204 may be a local area network (LAN), a wide area network (WAN), or the like, which supports both wired and wireless devices. The exemplary IVM client 208 is a VoIP softphone, the architecture of which will be described in detail hereinbelow with reference to FIG. 3. A microphone 212 is connected to the IVM client 208 and enables the recording of an instant voice message according to the present invention into an audio file 210 for transmission to the local IVM server 202 over the network 204. An input device 218 (e.g., a keyboard) is connected to the IVM client 208 to select one or more recipients that are to receive the recorded instant voice message. Although not depicted in FIG. 2, the input device 218 may include a trackball, digitizing pad or mouse, or the like. A display device 216 is connected to the IVM client 208 to display instant voice messages recorded and/or received by a user of the IVM client 208. An audio device 214, such as external speaker, is connected to the IVM client 208 to play received instant voice messages. It is noted that the microphone 212, audio device 214, display device 216 and input device 218 may form integral parts of the IVM client 208.

Further with reference to FIG. 2, IVM client 206 is interconnected via the network 204 to the local IVM server 202. An exemplary IVM client 206 is a VoIP telephone, which comprises a screen display (not shown) capable of displaying instant voice messages recorded and/or received by a user of the IVM client 206 according to the present invention. The VoIP telephone 206 further comprises a handset and/or speakerphone for recording instant voice messages and listening to instant voice messages received at the VoIP telephone 206 according to the present invention. The VoIP telephones which may be implemented to provide instant voice messaging functionality according to the present invention are commercially available from many vendors, including Alcatel™, Lucent™, NEC™ and Cisco™, to name just a few. In addition to the foregoing IVM clients 206, 208, the IVM system 200 supports a legacy telephone 110 for instant voice messaging according to the present invention. The legacy telephone 110 is connected to a legacy switch 112. The legacy switch 112 is further connected to a media gateway 114. Both the legacy switch 112 and the media gateway 114 interconnect the legacy telephone 110 via the network 204 to the local IVM server 202, thereby facilitating instant voice messaging according to the present invention. The media gateway 114 may be a gateway that supports trunk pack network control (i.e., "TPNCP") protocol, media gateway control protocol (i.e., "MGCP"), or a media gateway control H.428 protocol (i.e., "MEGACO"). As previously mentioned, the media gateway 114 converts the audio signal carried over PSTN to packets to be transmitted over a packet-switched IP network, such as the local network 204.

The implementation of the instant voice messaging for IVM client 208 will be described first and will be followed by the implementations for IVM client 206 and legacy telephone 110, with reference to the local IVM system 200 depicted in FIG. 2. These implementations implement a "record mode" of the instant voice messaging according to the present invention. There will further be described an "intercom mode" of the instant voice messaging according to the present invention. Therefore, in operation of the IVM client 208 according to FIG. 2, the IVM client (IVM softphone) 208 is connected over the network 204 to the IVM server 202, which as aforementioned enables instant voice messaging functionality over the network 204. The IVM client 208 displays a list of one or more IVM recipients on its display 216, provided and stored by the local IVM server 202, as will be particularly described hereinbelow with reference to FIG. 4. The user operates the IVM client 208 by using the input device 218 to indicate a selection of one or more IVM recipients from the list. The user selection is transmitted to the IVM server 202. The user selection also generates a start signal to the IVM client 208 that the user is ready to begin instant voice messaging according to the present invention. In response to the start signal, the IVM client (softphone) 208 listens to the input audio device 212 and records the user's speech into a digitized audio file 210 (i.e., instant voice message) stored on the IVM client 208. The audio file 210 at the IVM client 208 is finalized via a stop signal, which is generated by the user via the input device 218 or a preset time period without speech input via the input audio device 212 on the IVM client 208. Once the recording of the user's speech is finalized, IVM client 208 generates a send signal indicating that the digitized audio file 210 (instant voice message) is ready to be sent to the selected recipients. The user generates the send signal when the user operates the IVM client 208 via the input device 218, e.g., pressing a key on a keyboard or clicking a button on a mouse. The IVM client 208 transmits the digitized audio file 210 and the send signal to the local IVM server 202. In response to the send signal indicating that the instant voice message is ready to be sent, the IVM client 208 sends the recorded audio file 210 destined for the selected one or more recipients via local IVM server 202. After receiving the audio file 210, the IVM server 202 thereafter delivers the transmitted instant voice message to the selected one or more recipients via the local IP network 204. The one or more recipients are enabled to display an indication that the instant voice message has been received and audibly play the instant voice message to an associated user. It should be understood that only the available IVM recipients, currently connected to the IVM server 202, will receive the instant voice message. It is noted that if a recipient IVM client is not currently connected to the local IVM server 202 (i.e., is unavailable), the IVM server temporarily saves the instant voice message and delivers it to the IVM client when the IVM client connects to the local IVM server 202 (i.e., is available).

There are several embodiments for the operation of the IVM client (VoIP telephone) 206 within the IVM system 200, according to the present invention. In the first embodiment, the VoIP telephone 206 is a standalone IVM client 206 enabled for instant voice messaging according to the present invention. In the second embodiment, the VoIP telephone 206 operates synchronously either with the IVM client 208 or IVM server 202 to enable instant voice messaging according to the present invention. Thus, in operation according to the first embodiment in FIG. 2, the IVM client (VoIP telephone) 206 is connected over the network 204 to the IVM server 202, which as aforementioned enables instant voice messaging functionality over the local network 204. The IVM client 206 displays a list of one or more IVM recipients on its associated display provided and stored by the local IVM server 202, as will be particularly described hereinbelow with reference to FIG. 4. The user operates the IVM client 206 by using a keypad on the VoIP telephone 206 to indicate a selection of one or more IVM recipients from the list. The VoIP telephone 206 transmits the selection to the IVM server 202. The user selection also generates a start signal to the IVM client 206 indicating the user is ready to begin instant voice messaging according to the present invention. The user speaks into the handset of the IVM client 206 or a speakerphone on the IVM client 206. Although not shown in FIG. 2, the VoIP telephone 206 may provide a dedicated storage device, which in response to the start signal records an audio file, similar to the audio file 210 in the IVM client 208. The audio file is finalized via a stop signal. The stop signal is generated when the user presses a button on the keypad, a preset time period without speech input to the VoIP telephone 206, or when the user returns the handset to the cradle of the VoIP telephone 206. Once the recording of the user's speech is complete, a send signal is generated indicating that the instant voice message is ready to be sent to the selected recipients. The user generates the send signal when the user presses a button on the keypad or returns the handset of the VoIP telephone 206 to it cradle (on-hook). In response to the send signal, the IVM client 206 sends the recorded audio to the local IVM server 202 via the network 204. The IVM server 202 thereafter delivers the instant voice message to the selected one or more recipients via the IP network 204. As before, the one or more recipients are enabled to display an indication that the instant voice message has been received and audibly play the instant voice message. As aforementioned, if a recipient IVM client is not currently connected to the local IVM server 202, the IVM server 202 temporarily saves the instant voice message and delivers it to the IVM client when the IVM client connects to the local IVM server 202.

In the second embodiment of the IVM client 206 according to FIG. 2, the VoIP telephone 206 operates synchronously either with the IVM client 208 or the IVM server 202 to enable instant voice messaging according to the present invention. Thus, in operation according to the second embodiment, the IVM client (VoIP telephone) 206 is still connected over the network 204 to the IVM server 202, which as aforementioned enables instant voice messaging functionality over the local network 204. However, VoIP telephone 206 cooperates with the IVM client 208 or IVM server 202 to record and send an instant voice message. More specifically, the VoIP telephone 206 is only used as a recording/listening device for recording or listing to instant voice messages, while the IVM client 208 is used for displaying and selecting instant voice message recipients as described hereinabove. In operation, the IVM client 208 displays a list of IVM recipients on the display device 216 provided and stored by the local IVM server 202. The user operates the IVM client 208 by using the input device 218 on the IVM client 208 to indicate a selection of one or more IVM recipients from the list. The user selection is transmitted to the IVM server 202. The user selection generates a start signal to the IVM server 202 indicating that the user is ready to begin instant voice messaging according to the present invention. In response to receiving the start signal, the IVM server 202 transmits a ring signal to the VoIP telephone 206, thereby indicating to the user the IVM system 200 is ready to record an instant voice message. The IVM server 202 also signals the IVM client 208 to generate audio file 210 to record the instant voice message. As the user picks up the handset of the VoIP telephone 206 (off-hook), a connection is established via the network 204 between the local IVM server 202 and the VoIP telephone 206. Thereafter, the IVM server 202 forwards the user's speech transmitted from VoIP telephone 206 to the IVM client 208 for storage into digitized audio file 210 on the IVM client 208. The audio file 210 is finalized by returning the handset its cradle (on-hook) or by pressing a designated button on the keypad VoIP telephone 206, which transmits the stop signal to the IVM server 202 and further from the IVM server 202 to the IVM client 208. Returning the handset to its cradle preferably generates a send signal to the IVM server 202, which transmits the signal to the IVM client 208. The IVM client thereafter transmits the recorded audio file 210 (instant voice message) to IVM server 202 for delivery to the selected one or more IVM recipients. Alternatively, the user may press a key on the keyboard 218 to initiate the send signal. In response to the send signal, the IVM client 206 sends the recorded audio to the local IVM server 202 via the network 204. The IVM server 202 thereafter delivers the instant voice message to the selected one or more recipients via the IP network 204. The one or more recipients are enabled to display an indication that the instant voice message has been received and audibly play the instant voice message. If a recipient IVM client is not currently connected to the local IVM server 202, the IVM server 202 temporarily saves the instant voice message and delivers it to the IVM client when the IVM client connects to the local IVM server 202.

In operation of the legacy telephone 110 according to FIG. 2, the legacy telephone 110 is connected to the local IVM server 202 via media gateway 114 and legacy switch 112. The legacy telephone 110 cooperates with the IVM client 208 to record and send an instant voice message. More specifically, the legacy telephone 110 is used as a recording/listening device for recording or listing to instant voice messages, while the IVM client 208 is used for displaying and selecting instant voice message recipients as described hereinabove. Thus, in operation the IVM client 208 displays a list of IVM recipients on the display device 216 provided and stored by the local IVM server 202. The user operates the IVM client 208 by using the input device 218 on the IVM client 208 to indicate a selection of one or more IVM recipients from the list. The user selection is transmitted to the IVM server 202. The user selection generates a start signal to the IVM server 202 indicating that the user is ready to begin instant voice messaging according to the present invention. In response to receiving the start signal, the IVM server 202 transmits an emulation code to the legacy telephone 110 to ring, thereby indicating to the user the IVM system 200 is ready to record an instant voice message. As the user picks up the handset of the legacy telephone 110 (off-hook), a connection is established via the network 204 between the legacy telephone 110 and the IVM server 202. Thereafter, the IVM server forwards the user's speech transmitted from the legacy telephone 110 to the IVM client 208 for storage into the digitized audio file 210 (i.e., instant voice message). The audio file on the IVM client 208 is finalized by returning the handset of the legacy telephone 110 to its cradle (on-hook) or by pressing a designated button on the keypad of the legacy telephone 110, which transmits a stop signal to the IVM server 202 and further to the IVM client 208. Returning the handset to its cradle also generates a send signal to the IVM server to transmit the recorded audio file (instant voice message) to the selected one or more IVM recipients. The IVM server 202 thereafter delivers the instant voice message to the selected one or more recipients via the IP network 204. The one or more recipients are enabled to display an indication that the received instant voice message has been received and audibly play the instant voice message. If a recipient IVM client is not currently connected to the local IVM server 202, the IVM server 202 temporarily saves the instant voice message and delivers it to the IVM client when the IVM client connects to the local IVM server 202.

Regarding the operational embodiments described with reference to FIG. 2 for recoding and transmitting an instant voice message according to the present invention, the digitized audio file is preferably compressed by applying a compression algorithm before sending the audio file to the one or more selected recipients. The audio file is preferably compressed within the IVM clients 206, 208 before forwarding the audio file to the IVM server 202 for subsequent delivery to the one or more selected recipients. Alternatively, the compression may be implemented within the IVM server 202 before the audio file is transmitted to the one or more selected recipients. A Lempel-Ziv compression algorithm is preferably used to compress the audio file according to the present invention. It is noted that many suitable compression algorithms are known to persons of skill in the art, including Huffman encoding, audio compression standards promulgated by the Moving Pictures Experts Group ("MPEG"), G.722 wideband speech encoding standard, fractal compression, and wavelet compression. Any of the foregoing compression algorithms may be implemented within the scope of the present invention.

Further regarding the operational embodiments described with reference to FIG. 2 for recoding and transmitting an instant voice message according to the present invention, the digitized audio file (which may or may not be compressed as described above) is further preferably encrypted via an encryption algorithm before transmitting the audio file to the one or more selected recipients. The encryption is preferably implemented within the IVM clients 206, 208 before forwarding the audio file to the IVM server 202 for subsequent delivery to the one or more selected recipients. Alternatively, the encryption may be implemented within the IVM server 202 before the audio file is transmitted to the one or more selected recipients. An AES (Rijndael) encryption algorithm is preferably used to encrypt the audio file according to the present invention. It is noted that many suitable encryption algorithms are known to persons skilled in the art, including DES, Triple DES, Blowfish, Twofish, Serpent, and the like. Any of the foregoing encryption algorithms may be implemented within the scope of the present invention.

Lastly with reference to FIG. 2, in addition to the "record mode" of instant voice messaging, the instant voice messaging system 200 also supports an "intercom mode" of voice messaging. The "intercom mode" represents real-time instant voice messaging. In the "intercom mode," instead of creating an audio file 210, one or more buffers (not shown) of a predetermined size are generated in the IVM client 206, 208 or local IVM server 202. The one or more buffers are used to automatically write successive portions of the instant voice message. Once a first buffer is full, i.e., input audio of the predetermined size is written to the buffer, the content of the first buffer is automatically transmitted to the IVM server 202 for transmission to the one or more IVM recipients. A second buffer is meanwhile written with the next successive portion of input audio. Once, the second buffer is full, i.e., input audio of the predetermined size is written to the buffer, the content of the second buffer is transmitted to the IVM server 202 for transmission to the one or more IVM recipients. If the entire instant voice message or a successive portion thereof (such as a last successive portion in the instant voice message) written to either buffer is smaller the predetermined size, then the buffered content of less than the predetermined size is automatically transmitted to the IVM server 202. The foregoing buffering using the first and second buffers is repeated until the entire instant voice message has been transmitted to the IVM server 202 for transmission to the one or more IVM recipients. It is noted that the invention is not limited to a particular number of buffers. The foregoing buffering and transmission allows a "real-time" instant voice message to be transmitted to the one or more IVM recipients. The "intercom mode" may be designated as a default mode when an IVM recipient is on-line, while the "record mode" may be designated as a default if the IVM recipient is unavailable, i.e., not on-line. The user may easily change the "intercom mode" to the "record mode" on the respective IVM client 206, 208. Finally, the audio contents of the buffers may be signal processed (for clarity), encrypted and compressed before transmission, as will be described in more detail hereinbelow with reference to FIG. 3.

Figure 3:
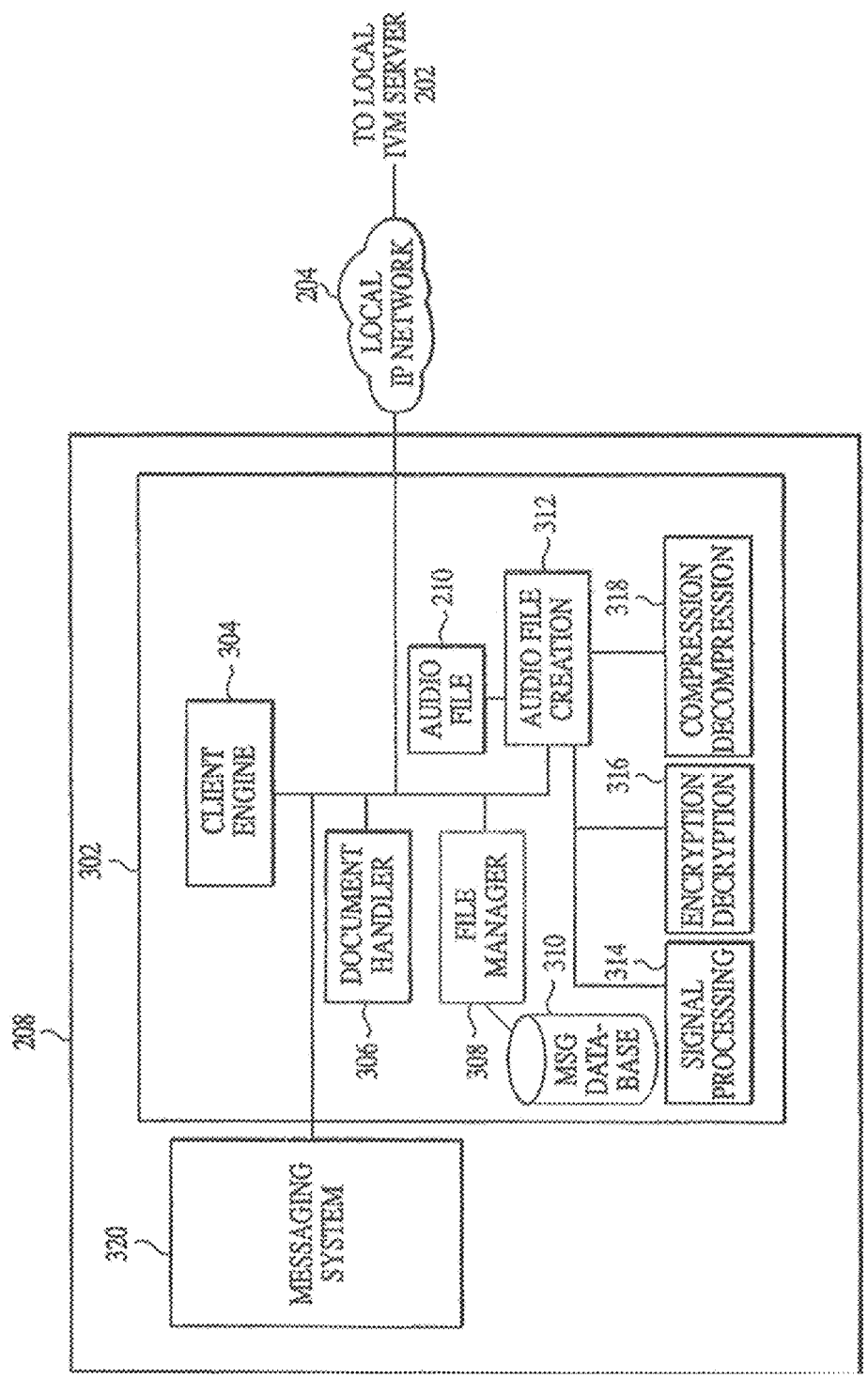
FIG. 3 illustrates an exemplary IVM client of FIG. 2 for enabling instant voice messaging according to the present invention.

FIG. 3 is an exemplary illustration of the architecture in the IVM client 208 for enabling instant voice messaging according to the present invention. More specifically, the IVM client 208 comprises a client platform 302 for generating an instant voice message and a messaging system 320 for messaging between the IVM client 208 and the IVM server 202 for enabling instant voice messaging according to the present invention. The IVM client 208 is a general-purpose programmable computer equipped with a network interface (not shown), such as an Ethernet card, to provide connectivity to the network 204. It is noted that any suitable networking protocol, not only Ethernet, could be used to connect the IVM client to a network 204 and thus is considered within the scope of the present invention. The client platform 302 comprises a client engine 304, which controls other components, namely the document handler 306, file manager 308, audio file creation 312, signal processing 314, encryption/decryption 316, and compression/decompression 318. The messaging system 320 and the client engine 304 communicate via standard inter-process communication. The messaging system 320 and client engine 304 also communicate with the IVM server 202 over the network interface via the network 204. The document handler 306 oversees the retrieving, sending, receiving and storing of one or more documents (or files) attached to instant voice messages from/to the one or more selected IVM recipients that may be communicating with the IVM client 208. More specifically, when an instant voice message is to be transmitted to the one or more IVM recipients, one or more documents may be attached to the instant voice message to be, stored or displayed by the one or more selected IVM recipients. The file manager accesses a message database 310, in which both the received and recorded instant voice messages are represented as database records, each record comprising a message identifier and the instant voice message. The file manager 308 services requests from the user to record, delete or retrieve messages to/from the message database 310. Audio file creation 312 creates an instant voice message as audio file 210, and is responsible for receiving input speech for the instant voice message from audio input device 212 or via network 204 and storing the input speech into audio file 210. Signal processing 314 performs noise removal and signal optimization in the audio file 210. Encryption/decryption 316 provides for respectively encrypting/decrypting of outgoing/incoming audio files (i.e., instant voice messages), and compression/decompression 318 respectively compresses/decompresses the outgoing/incoming audio files.

Further with reference to FIG. 3, the reception of an instant voice message is described as follows. It is assumed that the local IVM server 202 has determined that the IVM client 208 is available to receive an instant voice message by checking the IVM client's 208 current status, i.e., whether the IVM client 208 is "on-line." The local IVM server 202 maintains the current status of the IVM clients connected to the local IVM server 202, i.e., IVM clients 206, 208. It is further assumed that an IVM client has transmitted an instant voice message to the IVM client 208. The local IVM server 202 receives the instant voice message over the local IP network 204 and forwards the instant voice message to the IVM client 208. Upon receipt at the IVM client 208, the instant voice message is decrypted at 316, decompressed at 318, and stored in the message database 310 using the file manager 308. Any files attached to the instant voice message are also stored in the message database 310 using the file manager 308. A visual and/or sound effect is initiated to notify a user of the IVM client 208 that a new instant voice message has been received at the IVM client 208. At this point in time, the instant voice message and any file attachments are available to the user. The user can select the instant voice message from a listing of available instant voice messages displayed on the IVM client 208 and play the newly received instant voice message. The user may also open any file attachments and move or save the files to a separate location on the client using a drag-and-drop process.

Still further with reference to FIG. 3, the generation and transmission of an instant voice message is described as follows. The user selects the available one or more IVM recipients and initiates the creation of an instant voice message as described above with reference to FIG. 2. The client engine 304 detects the start signal and invokes audio file creation 312 of the audio file 210. The audio file 210 is initialized and captures the audio voice message input by the user. Once the client engine 304 detects a stop signal, the instant voice message is finalized in the audio file 210 via audio file creation 312. The audio file 210 is adjusted for gain, and noise is removed via signal processing 314. The audio file 210 is further compressed at 318 and encrypted at 316. The completion of these processes causes the client engine 304 to inform the user via display 216 that the instant voice message is available to be sent. After the client engine 304 detects the send signal from the user, the instant voice message (audio file 210) is transferred to the local IVM server 202. Before the transmission of the instant voice message (i.e., before the send signal), the user has the option to review the instant voice message, re-record the instant voice message, delete the instant voice, as well as attach one or more files (i.e., documents). The attachment of one or more files is enabled conventionally via a methodology such as "drag-and-drop" and the like, which invokes the document handler 306 to make the appropriate linkages to the one or more files and flags the messaging system 320 that the instant voice message also has the attached one or more files.

Figure 4:
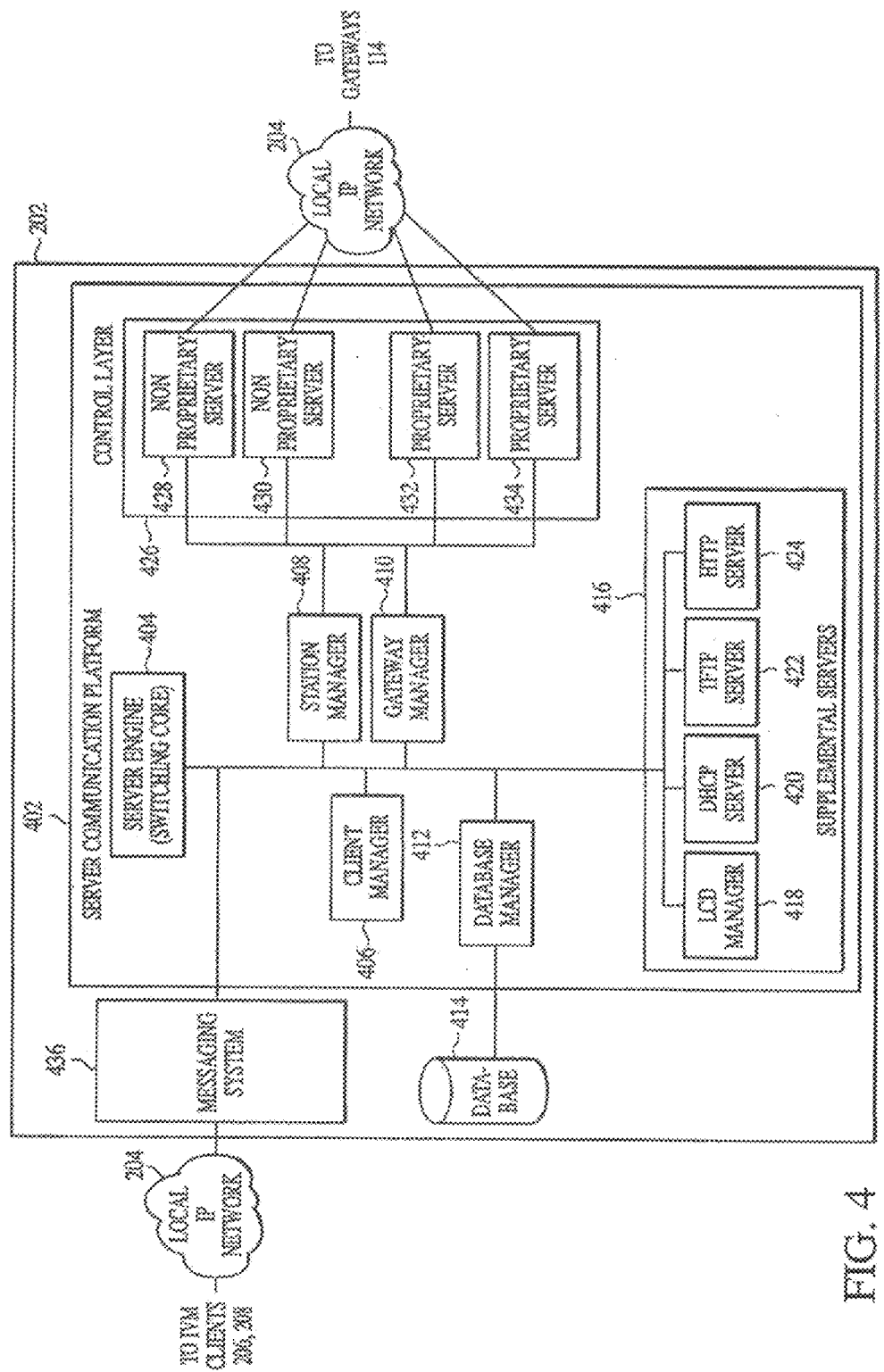
FIG. 4 illustrates an exemplary IVM server of FIG. 2 for enabling instant voice messaging according to the present invention.

FIG. 4 is an exemplary illustration of the local IVM server 202 for enabling instant voice messaging according to the present invention. The IVM server 202 is a general-purpose programmable computer equipped with a network interface, such as an Ethernet card, to provide connectivity to a network 204. It is noted that any suitable networking protocol may be implemented to connect the IVM server 202 to a network 204. The IVM server 202 comprises a server communication platform 402, a messaging system 436 and a database 414, thereby enabling instant voice messaging according to the present invention. The server communication platform 402 comprises a server engine 404, client manager 406, station manager 408, gateway manager 410, database manager 412 that accesses database 414, supplemental servers 416 (including particular server subsystems 418-424), as well as a control layer 426 (including non-proprietary server subsystems 428, 430 and proprietary server subsystems 432, 434). The messaging system 436 and the server engine 304 communicate via standard interprocess communication. The messaging system 436 and the server engine are also able to communicate with the IVM clients 206, 208 over the network interface via the network 204. The database 414 stores users (e.g., IVM clients as well as legacy telephone clients) that are known to the IVM server 202 via the database manager 412. The users are represented in the database as records, each record comprising a user name, a password, and a contact list (a list of other users with whom the user wishes to exchange instant voice messages), and other data relating to the user. The database manager 412 services requests to add, update, delete, or retrieve database records to/from the database 414. The password may be stored in the database 414 as plaintext, in encrypted form, or as a hash (e.g., MD5 hash). The messaging system 436 communicates to the server engine 404 via message objects.

A message object comprises an action field, an ID field, a source field, a destination field, and an object field. The content of the action field is selected from a list of permitted actions, which among other actions includes: connect, disconnect, subscribe, unsubscribe, and post message. In addition, the actions include: determining if an IVM client is awake (i.e., pinging), disconnecting from the IVM client, processing an IVM client message, and notifying IVM clients if the IVM server 202 goes down. The client messages include sending an instant voice message portions, checkin message, send message, set status message, send a phone command message, and send control parameters message. The content of the ID field represents a unique identifier for the message object. The content of the source field is a globally unique identifier ("GUID") that uniquely identifies the sender of the message. This unique identifier can be generated by any known way, including the Globally Unique ID function call available in the Microsoft Windows and Microsoft .NET environments. In some circumstances, the source field is set to a special value to indicate that the sender of the message object is entitled to special privileges. The senders with special privileges are in fact IVM servers. This allows the IVM servers to broadcast messages to one another, subscribe to special events, and directly send messages to specific IVM servers. These privileges can depend upon whether the IVM servers are local servers or global servers. As an example, there can exist more than one local IVM server, each of these local IVM servers automatically has privileges to communicate to other local IVM server. On a global server system, a directory server can communicate with one or more transport servers. The content of the destination field is a GUID of an intended IVM recipient of the instant voice message. The content of the object field is a block of data being carried by the message object, which may be, for example, a digitized instant voice message. Depending on the circumstances in which the message object is sent, some of the message object fields may be left blank or ignored. For example, the message object may merely require an action to be performed based upon the GUID supplied. In this case, the action does not necessarily require any data to be sent or received and some of the message object's fields may be left blank or ignored.

Connection objects maintain the logical connections between the IVM server 202 and IVM clients 206, 208 connected to the IVM server 202. More specifically, a connection object comprises data representing the state of the connection and code (one or more methods) for establishing and maintaining the logical connections between the IVM server 202 and the IVM clients 206, 208 within the IVM system 200 of FIG. 2. The connection object can contain both data and/or commands, including information that describes the socket, the size of the data to be transferred, and the priority of the transfer (e.g., high, normal, low, unknown). On start up the local IVM server 202 generates and maintains a list for each IVM client 206, 208. The local IVM server 202 then waits to receive connection objects from the IVM clients 206, 208 that are stored in the respective lists, decodes the received connection objects to obtain specific requests, and then services the specific requests from the IVM clients 206, 208.

Further with reference to FIG. 4, the server engine 404 controls all other subsystems in the server communication platform 402, and it is responsible for startup and shutdown of the IVM server 202 and the IVM system 200. The client manager 406 controls the IVM clients 206, 208, providing contact presence (connection) information and message scheduling and delivery. The station manager 408 controls the individual legacy telephone 110 and coordinates its activity to work synchronously with the IVM client 208 and server 202. The gateway manager 410 enables the IVM server 202 to communicate with the legacy telephones, such as legacy telephone 110. The control layer 426 comprises a plurality of server subsystems 428-434, each of which provides translation services to different proprietary and non-proprietary gateways 114, such as TPNCP, MGCP, and MEGACO gateways. The proprietary server subsystems 428, 430 and non-proprietary server subsystems 432, 434 are connected to respective gateways 114 via the local IP network 204. The supplemental server subsystems 416 provide a number of required services such as display manager subsystem 418, dynamic host configuration protocol (i.e., "DHCP") subsystem 420, trivial file transfer protocol (i.e., "TFTP") server subsystem 422, and hypertext transfer protocol (i.e., "HTTP"). Each of the supplemental servers 418-424 in the subsystem 416 is used during the initial set-up of the IVM system 200. The boot-up process and allocation of IP addresses to IVM clients 206, 208 are performed through an LCD panel (not shown) associated with the local IVM server 202. The LCD manager 418 supports this boot-up process. The DHCP server 420 is used to allocate IP addresses as required and allows the advanced configuration of network settings in the instant voice messaging system. The TFTP server 422 provides a TCP/IP file transfer capability. Lastly, the HTTP server 424 provides services for a web server.

Figure 5:
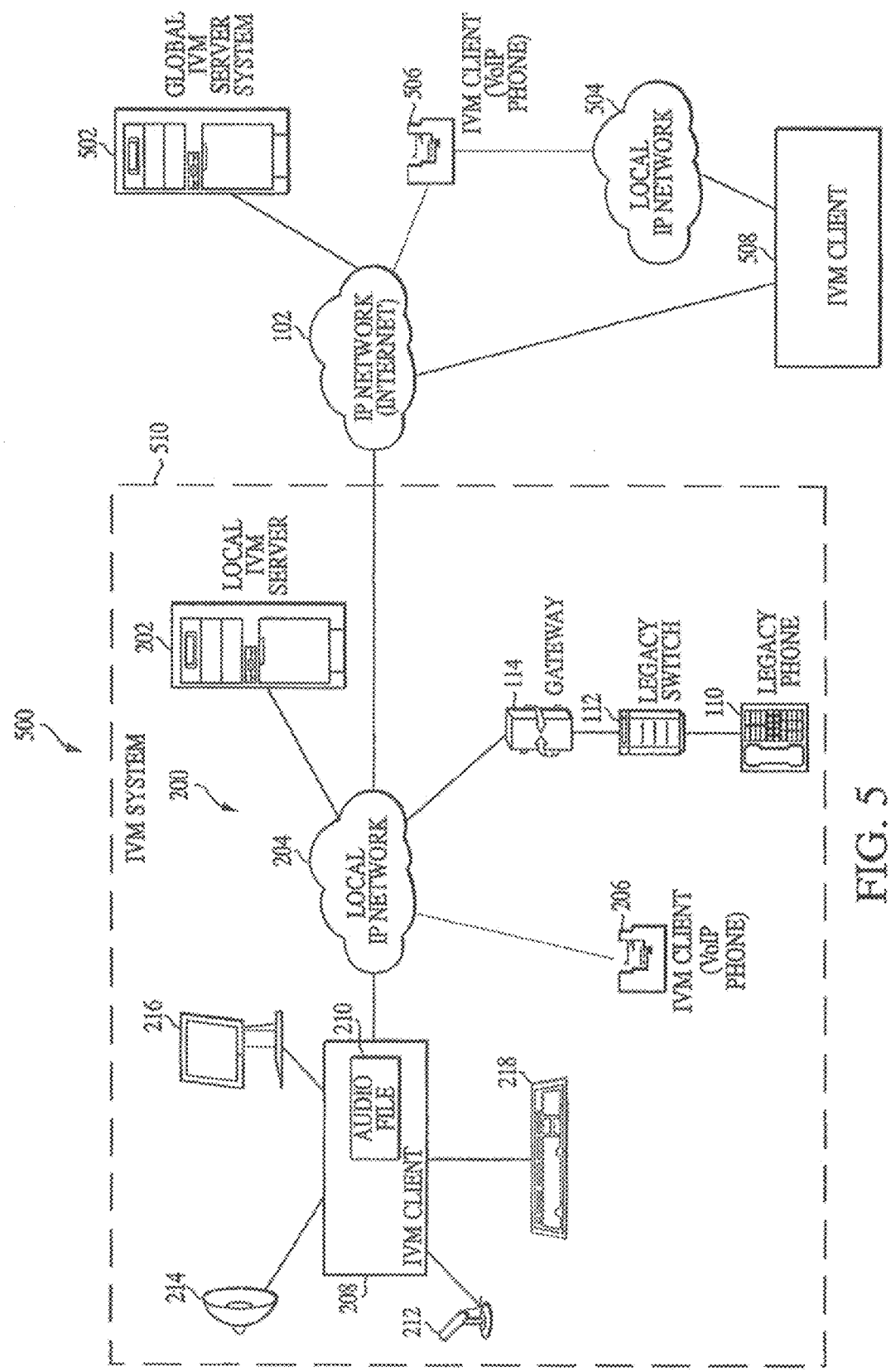
FIG. 5 illustrates an exemplary global IVM system comprising a local IVM system and global IVM clients, according to the present invention.

FIG. 5 is an exemplary illustration of a global instant voice messaging (IVM) system 500, according to the present invention. In the global IVM system 500, the local IVM system 200 is depicted as a local IVM system 510, which is connected to a packet-switched network 102 (i.e., Internet). The global IVM system 500 comprises the local IVM system 510, global IVM server system 502, and global IVM clients 506 and 508 that are optionally connected via local IP network 504. The global IVM server system 502 is connected to the IP network (i.e., Internet) 102 for enabling the local IVM clients 206, 208 and legacy telephone 110 in the local IVM system 510 to generate and send instant voice messages to the global IVM clients 506, 508, as well as the local IVM clients 206, 208 to receive instant voice messages from the global IVM clients 506, 508. The implementation of the global instant voice messaging for the IVM client 208 will be described first and will be followed by the implementations for IVM client 206 and legacy telephone 110, with reference to the global IVM system 500 depicted in FIG. 5. Thereafter, instant voice messaging for global clients 506 and 508 will be described according to the present invention. These implementations implement a "record mode" of the instant voice messaging according to the present invention. Thereafter, there will lastly be described an "intercom mode" of the instant voice messaging according to the present invention.

Therefore, in operation of the IVM client 208 according to FIG. 5, the IVM client 208 is connected via the networks 204, 102 to the global IVM server system 502, which enables the global instant voice messaging functionality outside the local IVM system 510 over the network (i.e., Internet) 102. More specifically, the IVM client 208 requests from the global IVM server system 502 a global contact list (not shown) of global one or more IVM recipients with which the IVM client 208 may exchange instant voice messages. For the purposes of illustration, it is assumed that global IVM clients 506, 508 are in the contact list. The global IVM server system 502 stores and maintains this contact list. Thus, the global IVM server system 502 responds by transmitting the contact list to the IVM client 208. The IVM client 208 displays the contact list on its display 216. Alternatively, the global contact list may be replicated to the local IVM server 202 within the local IVM system 510, in which case the local IVM client 208 obtains the global contact list from the local IVM server 202. The user operates the IVM client 208 by using the input device 218 to indicate a selection of one or more IVM recipients from the global contact list. Here, for the purposes of illustration it is again assumed that IVM client 208 selected global IVM clients 506, 508. The user selection is transmitted to the IVM server 202. The user selection also generates a start signal to the IVM client 208 that the user is ready to begin instant voice messaging. In response to the start signal, the IVM client 208 listens to the input audio device 212 and records the user's speech into a digitized audio file 210 (i.e., instant voice message) stored on the IVM client 208. The audio file 210 is finalized via a stop signal, which is generated by the user via the input device 218 or a preset time period without speech input via the input audio device 212. Once the recording is finalized, the IVM client 208 generates a send signal indicating that the digitized audio file 210 (instant voice message) is ready to be sent to the selected one or more IVM recipients. The user generates the send signal when the user operates the IVM client 208 via the input device 218. The IVM client 208 transmits the digitized audio file 210 and the send signal to the global IVM server system 502 via the local IP network 204 and the global IP network 102. After receiving the audio file 210, the global IVM server system 502 delivers the transmitted instant voice message to the selected one or more recipients (e.g., IVM clients 506 and 508) via the IP network 102. The one or more recipients are enabled to display an indication that the instant voice message has been received and audibly play the instant voice message to an associated user. It is noted that if a recipient IVM client 506, 508 is not currently connected to the global IVM server system 502, the global IVM server system 502 temporarily saves the instant voice message and delivers it to the global IVM client 506, 508 when the IVM client connects to the global IVM server system 502.

There are several embodiments for the operation of the IVM client (VoIP telephone) 206 within the global IVM system 500 of FIG. 5, according to the present invention. In the first embodiment, the VoIP telephone 206 is a standalone IVM client 206 enabled for instant voice messaging according to the present invention. In the second embodiment, the VoIP telephone 206 operates synchronously with the IVM client 208 to enable instant voice messaging according to the present invention. Thus, in operation according to the first embodiment in FIG. 5, the IVM client 206 is connected via the networks 204, 102 to the global IVM server system 502, which enables instant voice messaging functionality over the IP network (Internet) 102. As mentioned previously, the IVM client 206 is also connected to the local IVM server 202. The IVM client 208 requests from the global IVM server system 502 a global contact list (not shown) of the global one or more IVM recipients with which the IVM client 206 may exchange instant voice messages. For the purposes of illustration, it is assumed that the global IVM clients 506, 508 are in the contact list. The global IVM server system 502 stores and maintains this contact list. Thus, the global IVM server system 502 responds by transmitting the global contact list to the IVM client 206. Alternatively, the global contact list may be replicated to the local IVM server 202 within the local IVM system 510, in which case the local IVM client 206 obtains the global contact list from the local IVM server 202. The IVM client 206 displays a list of the one or more IVM recipients on its associated display. The user operates the IVM client 206 by using a keypad on the VoIP telephone 206 to indicate a selection of one or more IVM recipients from the list. The VoIP telephone 206 transmits the selection to the global IVM server system 502. The user selection also generates a start signal to the IVM client 206 indicating the user is ready to begin instant voice messaging according to the present invention. The user speaks into the handset of the IVM client 206 or a speakerphone on the IVM client 206. Although not shown in FIG. 5, the VoIP telephone 206 may provide a dedicated storage device, which in response to the start signal records an audio file, similar to the audio file 210 in the IVM client 208. The audio file is finalized via a stop signal. The stop signal is generated when the user presses a button on the keypad, a preset time period without speech input to the VoIP telephone 206, or when the user returns the handset to the cradle of the VoIP telephone 206. Once the recording of the user's speech is complete, a send signal is generated indicating that the instant voice message is ready to be sent to the selected recipients. The user generates the send signal when the user presses a button on the keypad or returns the handset of the VoIP telephone 206 to it cradle. In response to the send signal, the IVM client 206 sends the recorded audio file (instant voice message) to the global IVM server system 502 via the networks 204, 102 for delivery to the selected one or more IVM recipients. The global IVM server 502 thereafter delivers the instant voice message to the selected one or more recipients (e.g., IVM clients 506 and 508) via the IP network 102. As before, the one or more recipients are enabled to display an indication that the instant voice message has been received and audibly play the instant voice message. If a recipient IVM client is not currently connected to the global IVM server system 502, the global IVM server system 502 temporarily saves the instant voice message and delivers it to the IVM client when the IVM client connects to the global IVM server system 502.

In the second embodiment of the IVM client 206 according to FIG. 5, the VoIP telephone 206 operates synchronously with the IVM client 208 to enable global instant voice messaging according to the present invention. Thus, in operation according to the second embodiment in FIG. 5, the VoIP telephone 206 is connected over the network 204 to the IVM client 208 and the IVM client 208 is connected via the networks 204, 102 to the global IVM server system 502, which enables instant voice messaging functionality over the IP network (Internet) 102. The VoIP telephone 206 cooperates with the IVM client 208 to record and send a global instant voice message outside the local IVM system 510. The IVM client 208 displays a global contact list of IVM recipients (not shown) on the display device 216 provided by the global IVM server system 502, as described hereinabove. Alternatively, the global contact list may be replicated to the local IVM server 202 within the local IVM system 510, in which case the IVM client 208 obtains the global contact list from the local IVM server 202. The user operates the IVM client 208 by using the input device 218 to indicate a selection of one or more IVM recipients from the contact list. The user selection generates a start signal in the IVM client 208 indicating that the user is ready to begin instant voice messaging according to the present invention. In response to the start signal, the IVM client 208 generates audio file 210 to record an instant voice message and transmits a ring signal to the VoIP telephone 206. As the user picks up the handset of the VoIP telephone 206 (off-hook), a connection is established via the network 204 between the local IVM client 208 and the VoIP telephone 206. Thereafter, the VoIP telephone 206 forwards the user's speech to the IVM client 208 for storage into the audio file 210. The audio file 210 is finalized by returning the handset its cradle (on-hook) or by pressing a designated button on the keypad VoIP telephone 206, which transmits the stop signal to the IVM client 208. Returning the handset to its cradle preferably generates a send signal to the IVM client 208. The IVM client thereafter transmits the recorded audio file 210 (instant voice message) to the global IVM server system 502 via networks 204, 102 for delivery to the selected one or more IVM recipients. Alternatively, the user may press a key on the keyboard 218 to initiate the send signal. In response to the send signal, the IVM client 208 sends the recorded audio file to the global IVM server system 502 for delivery to the selected one or more IVM recipients. The global IVM server system 502 thereafter delivers the instant voice message to the selected one or more recipients (e.g., IVM clients 506 and 508) via the IP network 102. As before, the one or more IVM recipients are enabled to display an indication that the instant voice message has been received and audibly play the instant voice message. If a recipient IVM client is not currently connected to the global IVM server system 502, the global IVM server system 502 temporarily saves the instant voice message and delivers it to the IVM client when the IVM client connects to the global IVM server system 502.

In operation of the legacy telephone 110 according to FIG. 5, the legacy telephone 110 is connected to the local IVM client 208 via media gateway 114, legacy switch 112 and network 204. The legacy telephone 110 cooperates with the IVM client 208 to record and send an instant voice message outside the local IVM system 510. More specifically, the legacy telephone 110 is used as a recording/listening device for recording or listing to instant voice messages, while the IVM client 208 is used for displaying and selecting instant voice message recipients as described hereinabove. Thus, in operation the IVM client 208 requests from the global IVM server system 502 a global contact list of global one or more IVM recipients with which the IVM client 208 may exchange instant voice messages. Alternatively, the global contact list may be replicated to the local IVM server 202 within the local IVM system 510, in which case the IVM client 208 obtains the global contact list from the local IVM server 202. The IVM client 208 displays the global list of IVM recipients, as described hereinabove. The user operates the IVM client 208 to indicate a selection of one or more IVM recipients from the global contact list. The IVM client 208 transmits the user selection to the global IVM server system 502. The user selection generates a start signal in the IVM client 208 indicating that the user is ready to begin instant voice messaging according to the present invention. In response to the start signal, the IVM client 208 transmits an emulation code to the legacy telephone 110 to ring, thereby indicating to the user the global IVM system 500 is ready to record an instant voice message. As the user picks up the handset of the legacy telephone 110 (off-hook), a connection is established via the network 204 between the legacy telephone 110 and the IVM client 208. Thereafter, the user's speech is transmitted from the legacy telephone 110 to the IVM client 208 for storage into the digitized audio file 210 (i.e., instant voice message). The audio file 210 is finalized by returning the handset of the legacy telephone 110 to its cradle (on-hook) or by pressing a designated button on the keypad of the legacy telephone 110, which transmits a stop signal to the IVM client 208. Returning the handset to its cradle may also generate a send signal to the IVM client 208 to transmit the recorded audio file (instant voice message) to the global IVM server system 502 for delivery to the selected one or more IVM recipients. Alternatively, the send signal is preferably generated from the IVM client 208 as described hereinabove. The global IVM server system 502 thereafter delivers the instant voice message to the selected one or more IVM recipients via the IP network (Internet) 102. The one or more recipients are enabled to display an indication that the instant voice message has been received and audibly play the instant voice message. If a recipient IVM client is not currently connected to the global IVM server system 502, the global IVM server system 502 temporarily saves the instant voice message and delivers it to the IVM client when the IVM client connects to the global IVM server system 502.

Further with reference to FIG. 5, the instant voice messaging for global clients 506 and 508 will be described according to the present invention. In a first embodiment, each of the global IVM clients 506, 508 is enabled to independently send an instant voice message. The IVM clients 506, 508 have like peripheral devices and functionality described respectively with reference to local IVM clients 206, 208 in FIG. 2. In second embodiment described below, the VoIP telephone 506 operates in conjunction with the IVM client 508 to send an instant voice message. Therefore, in operation of the global IVM clients 506 and 508 according the first embodiment in FIG. 5, the IVM clients 506, 508 are connected via the networks 204, 102 to the global IVM server system 502, which enables the global instant voice messaging functionality outside the local IVM system 510 over the network (i.e., Internet) 102. Each of the global IVM clients 506, 508 is enabled to request from the global IVM server system 502 a contact list (not shown) of global one or more IVM recipients with which each of the global IVM client 506, 508 may exchange instant voice messages. For the purposes of this illustration, it is assumed that the IVM clients 206 and 208 within the local IVM system 510 are in the contact list for each global IVM client 506, 508. The global IVM server system 502 stores and maintains the foregoing contact list for each global IVM client 506, 508. Upon request, the global IVM server system 502 responds by transmitting the contact list to each of the IVM clients 506, 508. Each of the IVM clients 506, 508 displays the contact list on its display. The user operates the IVM client 506, 508 to indicate a selection of one or more IVM recipients from the contact list. Each of the global IVM clients 506, 508 transmits the user selection to the global IVM server system 502. The user selection also generates a start signal to the IVM clients 506, 508 that the user is ready to begin instant voice messaging. In response to the start signal, the IVM clients 506, 508 record the user's speech into a digitized audio file (i.e., instant voice message) stored on the global IVM clients 506, 508. The audio file is finalized via a stop signal, which is generated by the user by operating the global IVM client 506, 508. Once the recording is finalized, the IVM client 506, 508 generates a send signal indicating that the digitized audio file (instant voice message) is ready to be sent to the selected one or more recipients. The user generates the send signal when the user operates the global IVM client 506, 508. The IVM client 208 transmits the digitized audio file and the send signal to the global IVM server system 502. After receiving the audio file, the global IVM server system 502 delivers the transmitted instant voice message to the local IVM server 202 in the local IVM system 510 for delivery to the selected one or more recipients (e.g., local IVM clients 206 and 208) via the local IP network 204. The one or more recipients IVM 206, 208 are enabled to display an indication that the instant voice message has been received and audibly play the instant voice message to an associated user. It is noted that if a recipient IVM client 206, 208 is not currently connected to the local IVM server 202, the IVM server 202 temporarily saves the instant voice message and delivers it to the local IVM client 206, 208 when the IVM client connects to the local IVM server 202.

In the second embodiment of the IVM client 506 according to FIG. 5, the VoIP telephone 506 operates synchronously with the IVM client 508 to enable global instant voice messaging according to the present invention. In this embodiment, the VoIP telephone 506 and the IVM client 508 may be located in a user's residence and be connected to a local IP network 504. This local IP network 504 can be a WiFi network or a local area network (i.e., LAN), which is also within the user's residence. The local IP network 504 may be connected to the IP network (Internet) 102 via a digital subscriber line (i.e., DSL) connection, cable connection, dialup connection, or the like. As noted above, the IVM clients 506, 508 have like peripheral devices and functionality described respectively with reference to local IVM clients 206, 208 in FIG. 2. Thus, in operation according to this embodiment in FIG. 5, the global IVM client 508 requests from the global IVM server system 502 a contact list of global one or more IVM recipients with which each of the global IVM client 508 may exchange instant voice messages. For the purposes of this illustration, it is assumed that the IVM clients 206 and 208 within the local IVM system 510 are in the contact list for the global IVM client 508. The global IVM server system 502 stores and maintains the foregoing contact list for the global IVM client 508. The IVM client 508 displays a contact list of IVM recipients on the associated display device provided by the global IVM server system 502, as described hereinabove. The user operates the IVM client 508 by using the associated input device to indicate a selection of one or more IVM recipients from the contact list. The user selection generates a start signal in the IVM client 508 indicating that the user is ready to begin instant voice messaging according to the present invention. In response to the start signal, the IVM client 508 generates audio file to record an instant voice message and transmits a ring signal to the VoIP telephone 506 via local IP network 504. As the user picks up the handset of the VoIP telephone 206 (off-hook), a connection is established via the local network 504 between the local IVM client 508 and the VoIP telephone 506. Thereafter, the VoIP telephone 506 forwards the user's speech to the IVM client 508 for storage into the audio file at the IVM client 508. The audio file is finalized by returning the handset its cradle (on-hook) or by pressing a designated button on the keypad associated with the VoIP telephone 506, which transmits the stop signal to the IVM client 508. Returning the handset to its cradle preferably generates a send signal to the IVM client 508. The IVM client thereafter transmits the recorded audio file (instant voice message) to the global IVM server system 502 for delivery to the selected one or more IVM recipients. Alternatively, the user may press a key on the input device associated with the IVM client 508 to initiate the send signal. In response to the send signal, the IVM client 508 sends the recorded audio file to the global IVM server system 502 for delivery to the selected one or more IVM recipients. The global IVM server system 502 thereafter transmits the instant voice message to the local WM server 202 for delivery selected one or more recipients (e.g., local IVM clients 206 and 208) via the local IP network 204. As before, the one or more recipients are enabled to display an indication that the instant voice message has been received and audibly play the instant voice message. If a recipient IVM client is not currently connected to the local IVM server 202, the local IVM server 202 temporarily saves the instant voice message and delivers it to the IVM client when the IVM client connects to the local IVM server 202.

Lastly with reference to FIG. 5, in addition to the "record mode" of instant voice messaging as described above, the instant voice messaging system 500 also supports an "intercom mode" of the instant voice messaging. The "intercom mode" represents real-time instant voice messaging. In the "intercom mode," instead of creating an audio file as described hereinabove, one or more buffers (not shown) of a predetermined size are generated. The buffers may be generated in any one of the IVM clients 206, 208, 506 and 508, depending on how the global IVM system 500 is defined. The one or more buffers are used to automatically write successive portions of the instant voice message. Once a first buffer is full, i.e., input audio of the predetermined size is written to the buffer, the content of the first buffer is automatically transmitted. If the transmission is generated at a local IVM client 206, 208 and destined for one or more local IVM recipients, the content of the first buffer is transmitted to the local IVM server 202 for delivery to the local one or more recipients. If the transmission is generated at a local IVM client 206, 208 and destined for one or more global IVM recipients 506, 508, the content of the first buffer is transmitted to the global IVM server system 502 for delivery to the one or more global recipients. In addition, if the transmission is generated at a global IVM client 506, 508 and destined for the other global IVM clients, the content of the first buffer is transmitted to the global IVM server system 502, such as for example clients 506, 508. Lastly, if the transmission is generated at a global IVM client 506, 508 and destined for the local IVM clients 206, 208, the content of the first buffer is transmitted to the global IVM server system 502 and further transmitted by the global IVM server 502 to the local IVM server 202 for delivery to clients 206, 208 within the local IVM system 510. A second buffer is meanwhile written with the next successive portion of input audio. Once, the second buffer is full, i.e., input audio of the predetermined size is written to the buffer, the content of the second buffer is transmitted in similar fashion to the first buffer. If the entire instant voice message or a successive portion thereof (such as a last successive portion in the instant voice message) written to either buffer is smaller the predetermined size, then the buffered content of less than the predetermined size is automatically transmitted to the IVM server 202. The foregoing buffering using the first and second buffers is repeated until the entire instant voice message has been transmitted as described above. It is noted that the invention is not limited to a particular number of buffers. The foregoing buffering and transmission allows a "real-time" instant voice message to be transmitted to the one or more local, as well as global, IVM recipients. The "intercom mode" may be designated as a default mode when an IVM recipient is on-line, while the "record mode" may be designated as a default if the IVM recipient is unavailable, i.e., not on-line. The user may easily change the "intercom mode" to the "record mode" on the respective IVM client 206, 208, 506, 508. Finally, the audio contents of the buffers may be signal processed (for clarity), encrypted and compressed before transmission, as was described previously.

Figure 6:
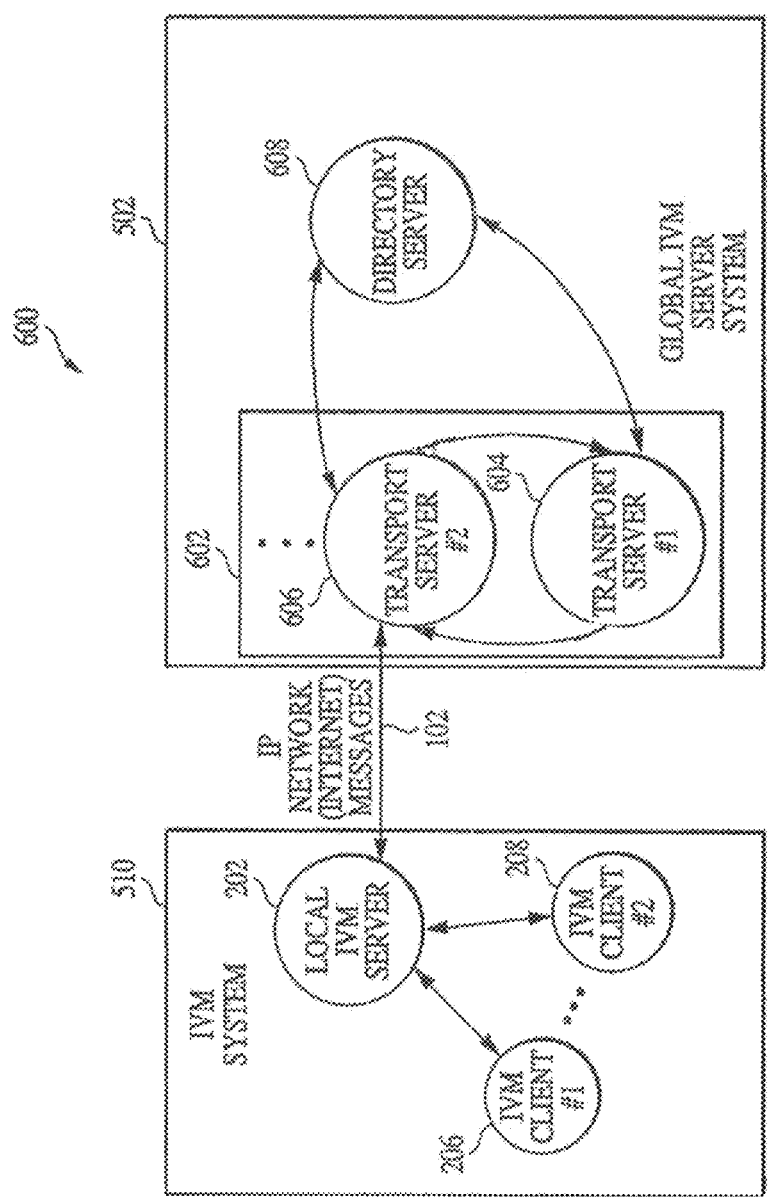
FIG. 6 illustrates an exemplary global IVM server system depicted in FIG. 5, according to the present invention.

FIG. 6 is an exemplary detailed illustration 600 of the global IVM server system 502 depicted in FIG. 5, according to the present invention. More specifically, the local IVM system 510 described in FIG. 5 is connected via the IP network (Internet) 102 to the global IVM server system 502. The global IVM server system 502 comprises an IVM transport server mesh 602 and an IVM directory server 608. The IVM transport server mesh 602 comprises a plurality of interconnected IVM transport servers 604, 606. Although the mesh 602 is depicted as having two IVM transport servers 604, 606, it is to be understood that as many IVM transport servers as are desired or required for redundancy and load balancing may be interconnected in a mesh. The IVM transport servers 604, 606 may be centrally located and configured to communicate (i.e., forward and receive messages) with local IVM clients 206, 208, local IVM server 202 and global IVM client 506, 508 (not depicted in FIG. 6). The plurality of IVM transport servers 604, 606 in the IVM transport server mesh 602 permits load balancing and redundancy in the global IVM system 500. The directory server 608 maintains a transport server list of all the IVM transport servers 604, 606 currently connecting to the mesh 602. Each of the IVM transport servers 604, 606 first connects to the directory server 608. The directory server 608 informs each of the connecting IVM transport servers 604, 606 of all the other IVM transport servers currently in the mesh 602 based on an active list (not shown) of transport servers 604, 606 in the mesh 602. The connecting IVM transport server then connects to each of the IVM transport servers in the transport server list, resulting in an interconnected mesh 602 of IVM transport servers 604, 606. The IVM transport servers 604, 606 and the IVM directory server 608 communicate via messages.

Further with reference to FIG. 6, the IVM transport servers 604, 606 connected in the mesh 602 share a database (not shown) of IVM clients, so that each IVM transport server 604, 606 refers to the same client database. It is preferable that each IVM transport server 604, 606 maintains its own copy of the client database, which is mirrored and replicated conventionally amongst the IVM transport servers 604, 606 in the mesh 602. The client database may further be replicated to the local IVM server 202. Alternatively, the client database is stored on a separate file server (not shown) in data communication with the IVM transport servers 604, 606 over a network (not shown).

Figure 7:
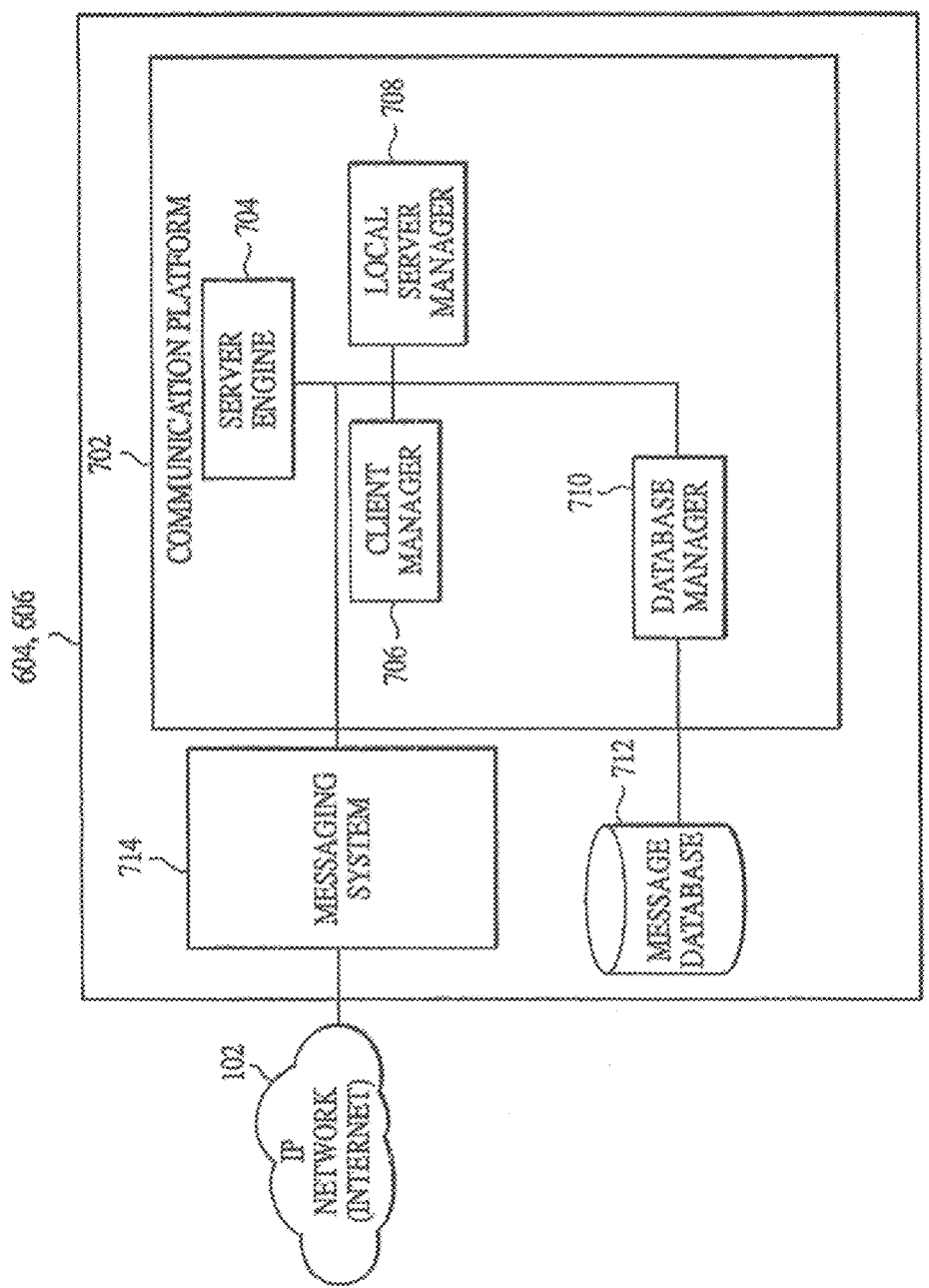
FIG. 7 illustrates an exemplary transport server depicted in FIG. 6, according to the present invention.

FIG. 7 is an exemplary detailed illustration of a transport server 604, 606 depicted in FIG. 6, according to the present invention. The IVM transport server 604, 606 is a general-purpose programmable computer comprising a network interface (not shown) connected to IP network (Internet) 102, a communication platform 702, a message database 712, and a messaging system 714. The communication platform 702 comprises a server engine 704, which controls a user manager 706, a local server manager 708, and a storage manager 710. The messaging system 714 and the server engine 704 communicate via standard inter-process communication. The storage manager 710 handles retrieving, sending, and storing of messages, including instant voice messages and attachments thereto, to/from the message database 712. The user manager 706 is responsible for creating/maintaining IVM clients 206, 208, 506, 508, identifying them and relaying their status to the server engine 704. When an IVM client communicates an instant voice message within the global IVM system 500, the user manager 706 notifies the server engine 704 whether the one or more recipients are unavailable, and thereby the instant voice message is saved in the message database 712. When the one or more IVM recipients become available, the user manager 706 notifies the server engine 704, which instructs the storage manager 710 to retrieve any undelivered instant voice messages for the one or more recipients and delivers the instant voice messages to the designated one or more IVM recipients. The local server manager 708 is responsible for creating/maintaining and providing the status of available local IVM servers, such as IVM server 202 in FIG. 2. The availability status of the local IVM servers is checked periodically and updated.

Figure 8:
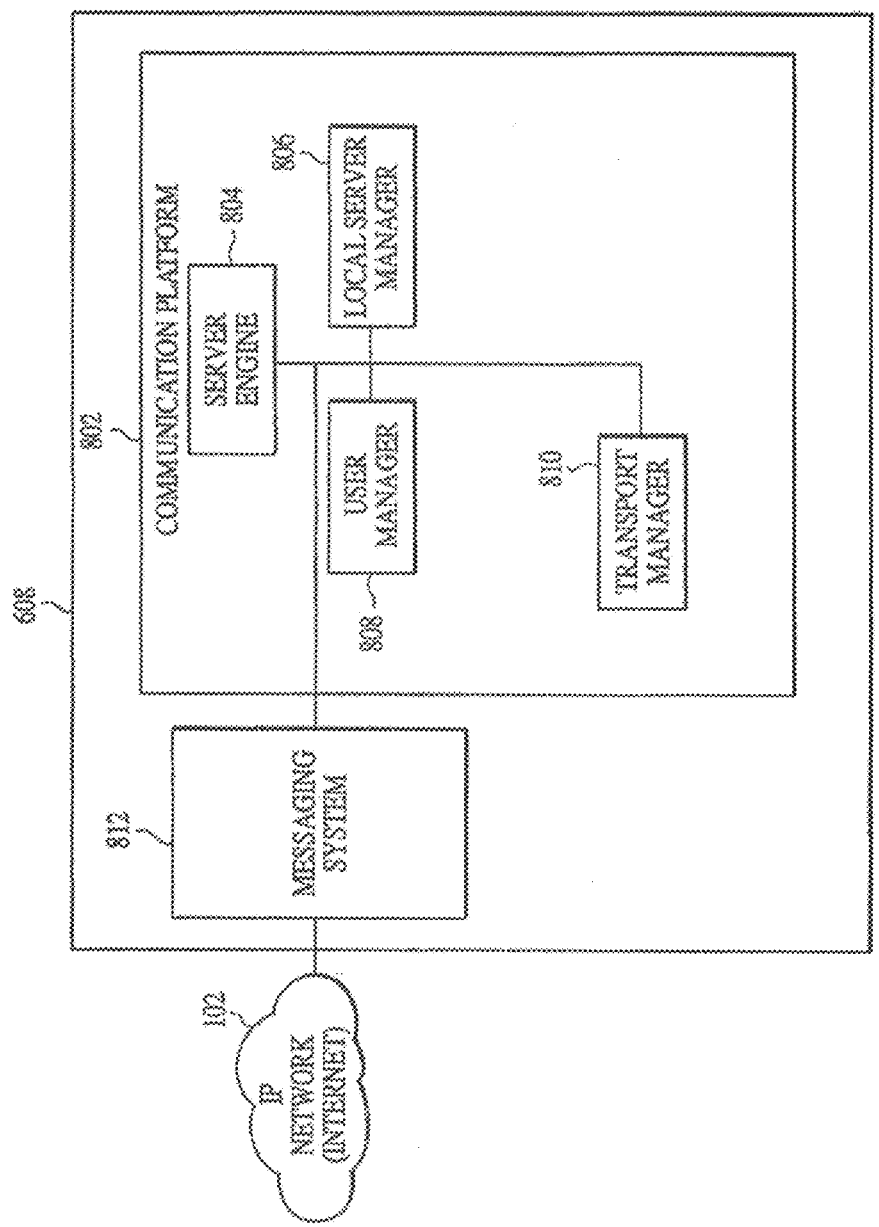
FIG. 8 illustrates an exemplary directory server depicted in FIG. 6, according to the present invention.

FIG. 8 is an exemplary detailed illustration of a directory server 608 depicted in FIG. 6, according to the present invention. The directory server 608 is a general-purpose programmable computer equipped with a network interface (not shown) connected to IP network (Internet) 102, a messaging system 812, and a communication platform 802. The communication platform 802 comprises a server engine 804, which controls a local server manager 806, a user manager 808, and a transport manager 810. The messaging system 812 and the server engine 804 communicate via standard inter-process communication. The transport manager 810 maintains the status of the IVM transport servers 604, 606 in the IVM transport server mesh 602 within the global IVM system 500 and using a load-balancing mechanism distributes instant voice messages to available transport server 604, 606 for routing to the one or more IVM recipients. The user manager 808 is responsible for creating/maintaining IVM clients 206, 208, 506, 508, identifying and relaying their status via the server engine 804 to the IVM transport server 604, 606 to be used. The local server manager 806 is responsible for creating/maintaining and providing the status of available local IVM servers, such as IVM server 202 in FIG. 2. The availability status of the local IVM servers is checked periodically and updated.

Figure 9:
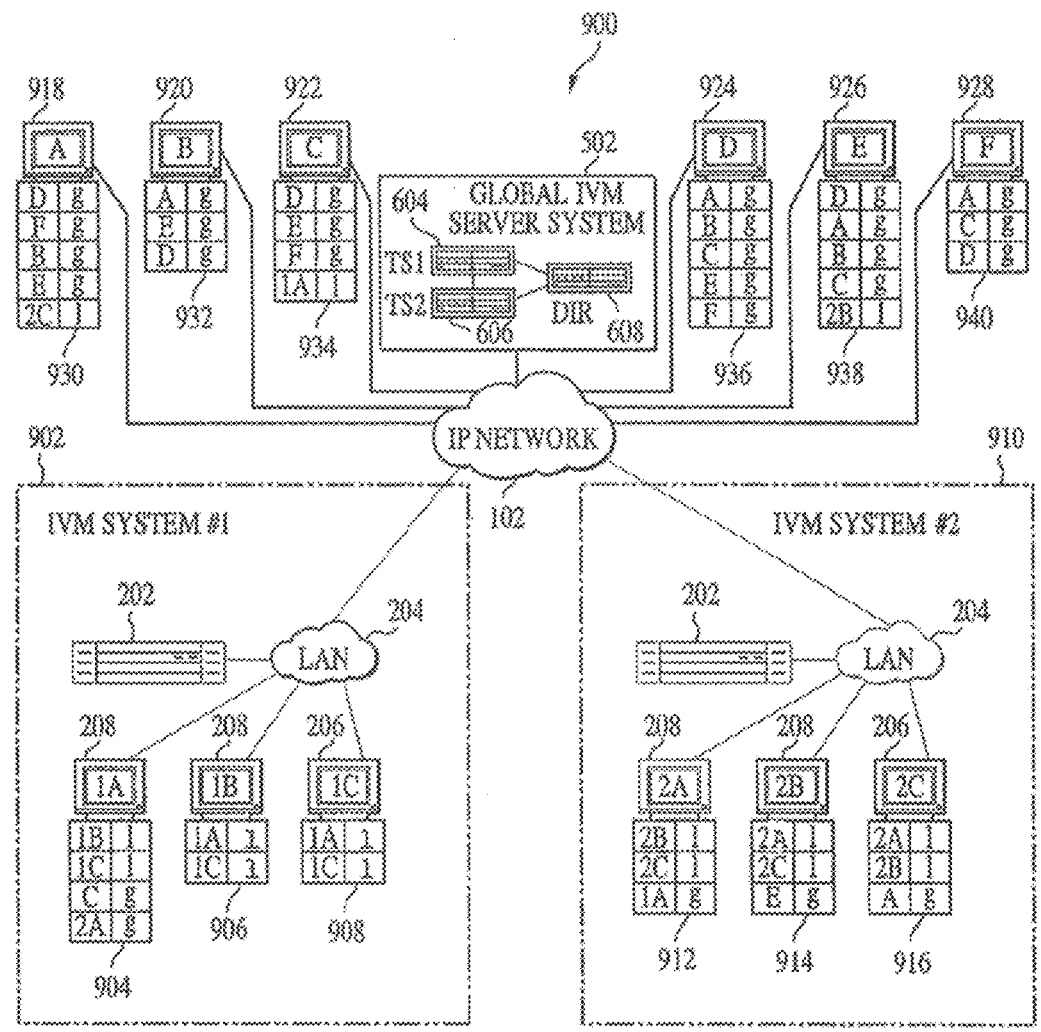
FIG. 9 illustrates an exemplary global IVM system comprising a plurality of local IVM systems and global IVM clients, according to the present invention.

FIG. 9 illustrates an exemplary a global instant voice messaging (IVM) system 900, which comprises a plurality of local IVM systems and a plurality of global IVM clients, according to the present invention. In the global IVM system 900, there are depicted a plurality of local IVM systems 902, 910 connected to the global IP network 102. The internal representation and functionality of each local IVM system 902, 904 is identical to the local IVM system 510 described with reference to FIG. 5. In global IVM system 900 of FIG. 9, there are also depicted a plurality of global IVM clients 918-928 and a global IVM server system 502 connected to the global IP network (i.e., Internet) 102. The internal representations of the global IVM client 918-928 and the global IVM server system 502 are identical to the respective IVM client 508 (and/or IVM client or 506) and the global IVM server system 502 described with reference to FIG. 5. In the local IVM system 902, each local IVM client 206, 208 is enabled to request local IVM recipients from the local IVM server 202 and global IVM recipients from either the global IVM server system 502 or the local IVM server 202. For example, the local IVM client 1A 208 displays a list 904 to a user, comprising both local and global IVM recipients. More specifically, the list 904 enables IVM client 1A to send instant voice messages according to the present invention to local IVM clients 1B 208 and 1C 206, global IVM client C 922 and global IVM client 2A 208 in the local IVM system 910. Similar lists 906-916 are displayed to the users of the respective IVM clients 1B-1C in local IVM system 902, and 2A-2C in local IVM system 910. In addition, the global clients A-F 918-928 are enabled to request IVM recipients from the global IVM server system 502 and display the respective lists of IVM recipients 930-940 on the respective IVM clients 918-928.

While the invention has been particularly shown and described with regard to preferred embodiments thereof, it will be understood by those skilled in the art that the foregoing and other changes in form and details may be made therein without departing from the spirit and scope of the invention.

What is claimed is:

1. A system, comprising:
an instant voice messaging application comprising:
a client platform generating one or more buffers, wherein the client platform writes one or more successive portions of an instant voice message to the one or more buffers;
a messaging system transmitting the contents of a buffer over a packet switched network once the contents of the buffer have reached a predetermined size;
and an instant voice messaging server receiving, from the instant voice messaging application, the contents of the one or more buffers and an indication of one or more intended recipients of the instant voice message,
wherein the instant voice messaging server transmits a ring signal and the contents of the one or more buffers to a legacy telephone.

2. The system according to claim 1 wherein the instant voice message is clarified, encrypted, and compressed by the instant voice messaging server.

3. The system according to claim 1 wherein the instant voice message is clarified, encrypted, and compressed by the instant messaging application.

4. The system according to claim 1 wherein the instant voice message is generated via input audio provided via a legacy telephone connected to the packet switched network.

5. The system according to claim 1 wherein the instant voice message is generated via input audio provided via a voice-over-internet-protocol (VoIP) telephone connected to the packet switched network.

6. The system according to claim 5 wherein the voice-over-internet-protocol (VoIP) telephone operates synchronously with the instant voice messaging server.

7. The system according to claim 5 wherein the voice-over-internet-protocol (VoIP) telephone operates synchronously with the instant voice messaging application.

8. The system according to claim 5 wherein the instant voice message is clarified by the voice-over-internet-protocol (VoIP) telephone.

9. The system according to claim 5 wherein the instant voice message is encrypted by the voice-over-internet-protocol (VoIP) telephone.

10. The system according to claim 5 wherein the instant voice message is compressed by the voice-over-internet-protocol (VoIP) telephone.

11. The system according to claim 1 wherein the instant voice messaging system maintains connection information for one or more intended recipients of the instant voice message which information includes data indicative of an availability state of the one or more intended recipients.

12. The system according to claim 11 wherein the instant voice messaging server includes a display output.

13. The system according to claim 11 wherein an indication of the availability of at least one intended recipient is displayed for a user of the instant messaging application or an indication of the unavailability of at least one intended recipient is displayed.

14. The system according to claim 13 wherein the instant voice messaging server displays an indication of the availability of the at least one intended recipient listed or additionally displays an indication of the unavailability of the at least one intended recipient listed.

15. The system according to claim 14 wherein the user of the instant voice messaging application can request that the list be displayed, and as a result of such request the list is displayed.

16. The system according to claim 1 wherein the instant voice messaging server additionally transmits a ring signal and the contents of the one or more buffers to a voice-over-internet-protocol (VoIP) telephone.

17. The system according to claim 2 wherein the instant voice message is decompressed by the voice-over-internet-protocol (VoIP) telephone.

18. The system according to claim 2 wherein the instant voice message is decrypted by the voice-over-internet-protocol (VoIP) telephone.

19. The system according to claim 1 wherein the instant voice message is additionally stored as a recorded file intended for delivery to one or more unavailable intended recipients.

20. The system according to claim 19 wherein a user of the client platform is presented with an option to hear the recorded instant voice message prior to its delivery; the instant voice message may be heard by the user; the user is thereafter presented with an option to delete the recorded instant voice message prior to its delivery; deletion of the instant voice message prevents delivery of the instant voice message; the instant voice message is deleted by the user; and the user is thereafter presented with an option to record an instant voice message.

\* \* \* \* \*